US 9,064,416 B1

(12) United States Patent
Foster

(10) Patent No.: US 9,064,416 B1
(45) Date of Patent: Jun. 23, 2015

(54) SYSTEMS AND METHODS FOR PROVIDING ALERTS REGARDING EXPIRATION OF AUTHORIZED PARKING

(75) Inventor: Andrew Foster, Narembum (AU)

(73) Assignee: GOOGLE INC., Mountain View, CA (US)

( * ) Notice: Subject to any disclaimer, the term of this patent is extended or adjusted under 35 U.S.C. 154(b) by 560 days.

(21) Appl. No.: 13/407,142

(22) Filed: Feb. 28, 2012

(51) Int. Cl.
G08G 1/14 (2006.01)
G07B 15/02 (2011.01)

(52) U.S. Cl.
CPC . *G08G 1/14* (2013.01); *G07B 15/02* (2013.01)

(58) Field of Classification Search
CPC ..... G07F 17/0014; G06Q 20/32; G07B 15/02
See application file for complete search history.

(56) References Cited

U.S. PATENT DOCUMENTS

| 7,949,464 | B2 | 5/2011 | Kaplan et al. |
| 2004/0015290 | A1* | 1/2004 | Curbow et al. ............... 701/117 |
| 2004/0068433 | A1 | 4/2004 | Chatterjee et al. |
| 2005/0280555 | A1 | 12/2005 | Warner, IV |
| 2006/0077055 | A1 | 4/2006 | Basir |
| 2007/0061192 | A1 | 3/2007 | Chew |
| 2009/0187342 | A1 | 7/2009 | Vavrus et al. |
| 2010/0017118 | A1* | 1/2010 | Dougherty ..................... 701/209 |
| 2010/0161207 | A1 | 6/2010 | Do |
| 2010/0198626 | A1 | 8/2010 | Cho et al. |
| 2010/0228473 | A1 | 9/2010 | Ranford |
| 2010/0302068 | A1 | 12/2010 | Bandukwala |
| 2011/0022427 | A1 | 1/2011 | Dayan |
| 2011/0060653 | A1 | 3/2011 | King et al. |
| 2011/0062230 | A1 | 3/2011 | Ward, II et al. |
| 2011/0106426 | A1 | 5/2011 | Tertoolen |

(Continued)

FOREIGN PATENT DOCUMENTS

| AU | 2003248283 B2 | 10/2003 |
| DE | 10019649 A1 | 11/2001 |

(Continued)

OTHER PUBLICATIONS

U.S. Appl. No. 13/755,196 entitled "Systems and Methods for Providing Navigational Assistance to a Parking Facility," by Andrew Foster, filed on Jan, 31, 2013.

(Continued)

*Primary Examiner* — Huy T Nguyen
(74) *Attorney, Agent, or Firm* — Marshall, Gerstein & Borun LLP

(57) ABSTRACT

A method including receiving image data corresponding to a photograph of a display of parking information including temporal restrictions for authorized parking in a parking location, the photograph captured via a mobile communications device, processing the image data to determine an estimated parking expiration time corresponding to a time when authorization for parking within the parking location will expire, substantially continuously tracking a current location of the mobile communications device and determining an estimated return time corresponding to an estimated time required to travel to the given parking location from the current location of the mobile communications device and, in response to determining that the estimated return time is about equal to or greater than the estimated parking expiration time, providing a parking expiration alert indicative of the estimated return time being determined to be about equal to or greater than the estimated parking expiration time.

20 Claims, 5 Drawing Sheets

(56) References Cited

U.S. PATENT DOCUMENTS

| | | |
|---|---|---|
| 2011/0131154 A1 | 6/2011 | Faber et al. |
| 2011/0140922 A1 | 6/2011 | Levy et al. |
| 2011/0143779 A1 | 6/2011 | Rowe et al. |
| 2011/0153190 A1 | 6/2011 | Rolinski et al. |
| 2011/0178703 A1 | 7/2011 | Aben et al. |
| 2011/0225068 A1 | 9/2011 | Figueroa et al. |
| 2012/0095812 A1* | 4/2012 | Stefik et al. .................. 705/13 |

FOREIGN PATENT DOCUMENTS

| | | |
|---|---|---|
| DE | 10 2004 028491 B4 | 5/2006 |
| JP | 2002298175 A | 10/2002 |
| JP | 2005011235 A | 1/2005 |
| JP | 2007285734 A | 11/2007 |
| JP | 2008146652 A | 6/2008 |
| JP | 2009058492 A | 3/2009 |
| KR | 2010057438 A | 5/2010 |
| NL | 1014109 C2 | 4/2002 |
| WO | 2001041029 A1 | 6/2001 |
| WO | 2006106369 A1 | 10/2006 |

OTHER PUBLICATIONS

Yan, Gongiun, et al., "Smart Parking: A Secure & Intelligent Parking System", IEEE Intelligent Transportation Systems Magazine, Spring 2011, pp. 18-30.

Crowder, Michelle, et al., "Developing an Intelligent Parking Systems for the University of Texas at Austin", May 2003, Southwest Regional University Transportation Center, pp. 1-59.

Wang, Hongwei, et al., "A Reservation-Based Smart Parking System", The First International Workshop on Cyber-Physical Networking Systems-IEEE, 2011, pp. 690-695.

Koralalage, Krishan Sabaragam, et al., "iPark: A Universal Solution for Vehicle Parking", WSKS, 2009, Springer-Verlag Berlin Heidelberg, pp. 594-604.

Khang, Soh Chun, et al., "Wireless Mobile-Based Shopping Mall Car Parking System (WMCPS)", IEEE Asia-Pacific Services Computing Conference, 2010, pp. 573-577.

U.S. Appl. No. 13/407,122, entitled "Systems and Methods for Providing Navigational Assistance to Reserved Parking Locations" by Sashanka Vishnuvajhala, filed Feb. 28, 2012.

* cited by examiner

SYSTEMS AND METHODS FOR PROVIDING ALERTS REGARDING EXPIRATION OF AUTHORIZED PARKING

BACKGROUND OF THE INVENTION

1. Field of the Invention

This invention relates generally to assessing limitations on authorized parking and more particularly to acquiring and providing information regarding the expiration of authorized parking.

2. Description of the Related Art

Parking locations often include limitations on the time periods within which vehicles are allowed to park therein. For example, certain parking spaces may allow parking for a given period of time (e.g., two-hour parking limit), only during certain times of the day (e.g., parking allowed from 8 am-5 pm) and so forth. Some parking locations include paid parking that requires payment of a parking fee. For example, a paid parking space may require payment of a parking fee in exchange for a right to park a vehicle in the parking space for a given period of time.

In many instances, users may be subject to a penalty if their vehicle is parked without authorization. For example, if a user's vehicle is parked in a parking space outside of authorized time periods, the user may be issued a parking citation (e.g., a parking ticket requiring payment of a penalty fee), the user's vehicle may be towed, or the like. Accordingly, users typically try to avoid instances in which their vehicle is parked in a parking location during unauthorized times. Unfortunately, avoiding such circumstances is not always an easy task. For example, users may misinterpret requirements for authorized parking (e.g., a user may misread a parking sign), users may forget that a time period for authorized parking is about to expire or has already expired, or users may underestimate the time required to return to their vehicle such that authorized parking expires prior to their return to the parking space.

SUMMARY OF THE INVENTION

Various embodiments of methods and apparatus for providing assessing temporal limitations of parking location and providing reminders regarding expiration of authorized parking are provided herein. In some embodiments, provided is a method of providing a parking expiration alert. The method includes receiving image data corresponding to a photograph of a display of parking information including temporal restrictions for authorized parking in a parking location, the photograph captured via a mobile communications device, processing the image data to determine an estimated parking expiration time corresponding to a time when authorization for parking in the parking location will expire, substantially continuously tracking a current location of the mobile communications device and determining an estimated return time corresponding to an estimated time required to travel to the given parking location from the current location of the mobile communications device and, in response to determining that the estimated return time is about equal to or greater than the estimated parking expiration time, providing a parking expiration alert indicative of the estimated return time being determined to be about equal to or greater than the estimated parking expiration time, the parking expiration alert to be presented to a user via a user interface of the mobile communications device.

In some embodiments, provided is a computer-implemented method that includes receiving image data corresponding to a photographic image acquired via a mobile communications device, the photographic image including an image of physically displayed parking information associated with a parking location, the parking information indicative of temporal limitations for parking within the parking location, determining a parking expiration time based on the image data, the parking expiration time being indicative of a time when authorization for a vehicle parked in the parking location will expire, and providing, to the mobile communications device, expiration data indicative of the parking expiration time, an indication of the parking expiration time to be presented to a user via a user interface of the mobile communications device.

In some embodiments, provided is a non-transitory computer readable storage medium having computer-executable program instructions stored thereon that are executable by a computer to cause steps including receiving image data corresponding to a photographic image acquired via a mobile communications device, the photographic image including an image of physically displayed parking information associated with a parking location, the parking information indicative of temporal limitations for parking within the parking location, determining a parking expiration time based on the image data, the parking expiration time being indicative of a time when authorization for a vehicle parked in the parking location will expire, and providing, to the mobile communications device, expiration data indicative of the parking expiration time, an indication of the parking expiration time to be presented to a user via a user interface of the mobile communications device.

In some embodiments, provided is a system that includes a processor, a memory and a parking management module stored on the memory. The parking management module is to be executed by the processor to cause receiving image data corresponding to a photographic image acquired via a mobile communications device, the photographic image including an image of physically displayed parking information associated with a parking location, the parking information indicative of temporal limitations for parking within the parking location, determining a parking expiration time based on the image data, the parking expiration time being indicative of a time when authorization for a vehicle parked in the parking location will expire, and providing, to the mobile communications device, expiration data indicative of the parking expiration time, an indication of the parking expiration time to be presented to a user via a user interface of the mobile communications device.

DETAILED DESCRIPTION OF THE PREFERRED EMBODIMENTS

Figure 1:
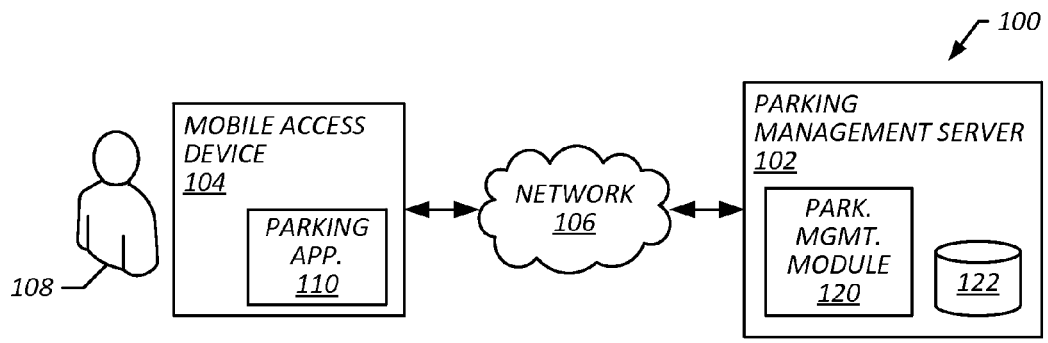
FIG. 1 is a diagram that illustrates an exemplary parking management system in accordance with one or more embodiments of the present technique.

As discussed in more detail below, systems and methods for assessing temporal limitations of parking locations and providing reminders regarding expiration of authorized parking are provided herein. In some embodiments, parking information may be visibly displayed in association with a parking location (e.g., a parking space, a parking facility or the like) via a parking sign, a parking receipt, a parking meter, or the like. In certain embodiments, the parking information may be indicative of temporal limitations for authorized and/or unauthorized parking in within a parking location (e.g., "Two Hour Parking", "No Parking M-F 5 pm-8 am", "Remaining Time 2 hr 00 min", and so forth). In some embodiments, an image of visibly displayed parking information may be acquired for use in identifying temporal limitations for authorized and/or unauthorized parking within a parking location. In certain embodiments, an image of visibly displayed parking information may include a photographic image of the visibly displayed parking information acquired via an image capture device of a user's mobile communications device, such as an integrated camera of a cellular phone. In some embodiments, the image may be associated with a time when the image is acquired and/or a location at which the image is acquired (e.g., a geographic location of the mobile communications device at or near the time of acquiring the image and/or the geographic location of the parking space).

In some embodiments, parking information captured within an image may be processed to identify temporal limitations for authorized and/or unauthorized parking within a parking location associated therewith. In certain embodiments, processing of an image may include application of optical character recognition, pattern matching, shape matching and/or the like to identify temporal parking limitations corresponding to the parking information. In some embodiments, a parking expiration time may be determined based on temporal parking limitations that are identified. In certain embodiments, a parking expiration time may include, or otherwise be indicative of, a time when authorization for a vehicle currently parked in a parking location expires. In some embodiments, a parking expiration time may include an absolute time (e.g., "5:00 pm") and/or a duration (e.g., "three hours remaining") indicative of a time when parking authorization expires. In certain embodiments, a parking expiration time may be presented to a user to inform the user of the parking expiration time. In some embodiments, a parking expiration time may be displayed or otherwise presented to a user via a mobile communications device.

In certain embodiments, one or more parking expiration reminders may be provided for presentation to a user. In some embodiments, providing a parking expiration reminder may afford a user an opportunity to resolve issues regarding parking of their vehicle in a parking location (e.g., a user may be reminded to pay an additional fee to extend a time period for authorized parking, to physically move the vehicle from a parking location, or the like). In certain embodiments, a parking expiration reminder may be provided at or near a time of day corresponding to the parking expiration time. In some embodiments, a parking expiration reminder may be provided at a time day of day that precedes a parking expiration time by enough time to allow a user to resolve issues regarding expiration of parking authorization prior to the actual expiration of parking authorization. In some embodiments, a parking expiration reminder may be provided at a time of day that enables a user to return to a location where their vehicle is parked (e.g., a parking location) prior to the expiration time. In certain embodiments, the time at which a parking expiration reminder is provided may be based on an estimated time required for a user to return to the parking location from their current location (e.g., an estimated travel time). In certain embodiments, a parking location may be determined based on a geographic location of a mobile communications device at or near the time of acquiring an image of parking information associated with the parking location. In some embodiments, a user's current location may be determined based on a current geographic location of the mobile communications device.

In some embodiments, a parking expiration reminder may be provide when an estimated return time is equal to or greater than a parking expiration time such that a user is provided with the reminder with enough time to return to the parking location and resolve any potential parking issues prior to the parking expiration time. In certain embodiments, an estimated travel time may include an additional margin of safety (e.g., an extra five minutes) to account for potential delays in a user receiving the parking expiration reminder and/or returning to a parking location.

FIG. 1 is a diagram that illustrates an exemplary parking management system ("system") 100 in accordance with one or more embodiments of the present technique. As depicted, system 100 may include a parking management server 102 and a mobile access device ("access device") 104 communicatively coupled via a network 106.

Network 106 may include any element or system that facilitates communications between the entities of system 100. For example, network 106 may include a communications network that facilitates communication between parking management server 102 and one or more access devices 104. Network 106 may include an electronic communication network, such as the Internet, a local area network (LAN), a wide area (WAN), a cellular communications network or the like. Network 106 may facilitate data exchange by way of packet switching using the Internet Protocol (IP). Network 106 may facilitate wired and/or wireless connectivity and communication. Network 106 may include a single network or combination of networks that facilitate communication between the entities of system 100.

Access device 104 may be capable of transmitting and/or receiving information via network 106. Access device 104 may be employed by a user 108 to interact with other entities coupled to network 106. Access device 104 may include one or more of a personal computer (e.g., a desktop computer), a mobile computing device (e.g., a laptop or tablet computer), a cellular communication device (e.g., a cellular phone), a personal digital assistant (PDA), a media player/recorder, a game console, a television system, an audio system, a radio system, a navigation system, or the like. Access device 104 may include a mobile communications device capable of being coupled to network 106 via a cellular communications network or similar wireless network. For example, access device 104 may include a cellular phone, a personal digital assistant (PDA), a laptop computer, a tablet computer, or similar mobile computing device capable of wireless and/or wired communication with parking management server 102 via network 106.

Access device 104 may include various input/output (I/O) interfaces such as a graphical user interface (e.g., display screen), an audible output user interface (e.g., speaker), a keyboard, a pointer device (e.g., mouse, trackball, touchpad, stylus or the like), an audible input user interface (e.g., microphone), a printer, or the like. In some embodiments, access device 104 may include a computer system similar to that of computer system 1000 described below with regard to at least FIG. 9.

Access device 104 may include general computing components and/or embedded systems optimized with specific components for performing specific tasks. Access device 104 may include a program/application that can be used to generate a request for content, to provide content, to render content, and/or to send/receive requests to other devices via network 106. For example, access device 104 may employ a parking application 110. Parking application 110 may be implemented via an Internet web-browser application, a standalone parking assistance application and/or a similar application executed by access device 104. In some embodiments, application 110 may include a module including program instructions that are executable by a computer system to perform some or all of the functionality described herein with regard to access device 104. Application 110 may be used to transmit and/or receive data and/or content via network 106, process data, render data/content for display via a graphical user interface of access device 104, and/or enable user interaction with data and/or content via a user interface of access device 104.

Parking management server 102 may include a server or similar device/system for processing and serving client requests for parking assistance. In some embodiments, parking management server 102 may include a computer system similar to that of computer system 1000 described below with regard to at least FIG. 9. Although parking management server 102 is represented by a single box, parking management server 102 may include a single server or similar system, or a plurality of servers and/or similar systems. For example, parking management server 102 may include a plurality of different servers and/or similar systems that may be employed individually or in combination to perform some or all of the functionality described herein with regard to parking management server 102. In some embodiments, a plurality of servers and/or similar systems may be employed in combination to provide load balanced processing, (e.g., distributing processing tasks between the plurality of servers and/or similar systems).

In some embodiments, parking management server 102 may include a parking management module 120. Parking management module 120 may include program instructions that are executable by a computer system to perform at least some or all of the functionality described herein with regard to at least parking management server 102. In some embodiments, parking management module 120 may provide for processing and serving requests for parking assistance and related data. For example, parking management server 102 may include an application or similar processing environment that provides for receiving (e.g., from access devices 104) images of parking information, processing the images to identify temporal parking limitations, and serving (e.g., to access devices 104) parking expiration reminders relating to expiration of time periods for authorized parking.

In some embodiments, parking management server 102 may include or otherwise have access to a datastore 122. Datastore 122 may include a database and/or other memory location for storing data. In some embodiments, parking management module 120 may be stored on datastore 122. In some embodiments, data used for processing and/or serving requests may be stored on datastore 122.

Figure 2:
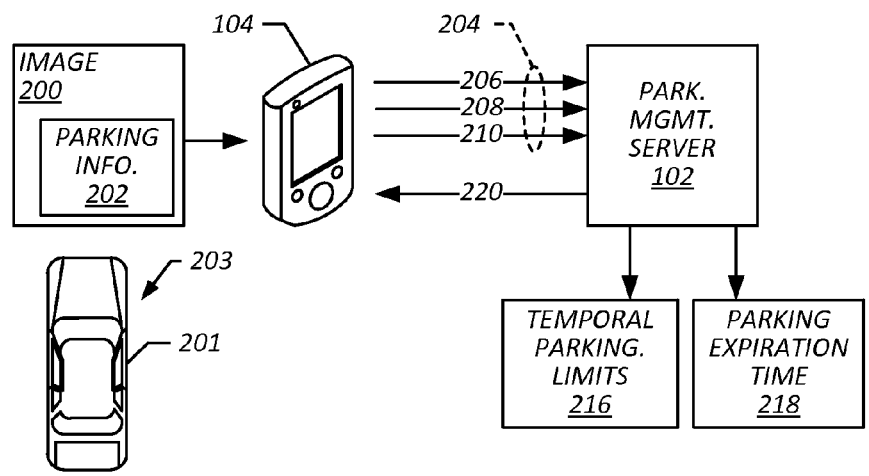
FIG. 2 is a diagram that illustrates operation of an exemplary parking management system in accordance with one or more embodiments of the present technique.

FIG. 2 is a diagram that illustrates operations of an exemplary embodiment of parking management system 100 in accordance with one or more embodiments of the present technique. In some embodiments, an image 200 of visibly displayed parking information 202 may be acquired via access device 104. Parking information 202 may be associated with a parking location 203 (e.g., one or more parking spaces). For example, upon user 108 parking their vehicle 201 in parking location 203, user 108 may employ an image capture device (e.g., a camera) of access device 104 to acquire a photographic image of a parking sign, parking receipt, parking meter or the like that provides a visual display of parking information 202 associated with parking location 203. Parking information 202 for a given parking location 203 may include text, symbols or other information indicative of temporal limitations for authorized parking within the given parking location 203.

FIGS. 3A-3D illustrate exemplary images 200a-200d of parking signs 300a-300d displaying parking information 202a-202d in accordance with one or more embodiments of the present technique. Parking signs 300a-300d (collectively referred to herein as parking signs 300) may include signs that are posted at or near a parking space or similar parking locations. For example, parking signs 300 may be posted adjacent an individual parking space or a group of parking spaces of a parking facility such that a vehicle operator is likely to see the posted sign at or near the time of parking their vehicle within a parking space of the parking facility.

Figure 3A:
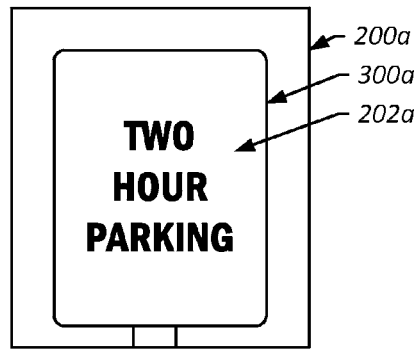
FIGS. 3A-3D illustrate exemplary images of parking signs displaying parking information in accordance with one or more embodiments of the present technique.

FIG. 3A illustrates an exemplary image 200a of a parking sign 300a including parking information 202a specifying "Two Hour Parking". "Two Hour Parking" may be indicative of a two hour parking limit. Accordingly, a vehicle may be authorized to park in a parking space corresponding to parking sign 300a for a maximum duration of two consecutive hours. Vehicles may need to be moved from a parking space corresponding to parking sign 300a within two hours of being parked in the space to avoid a penalty (e.g., a parking citation or towing).

Figure 3B:
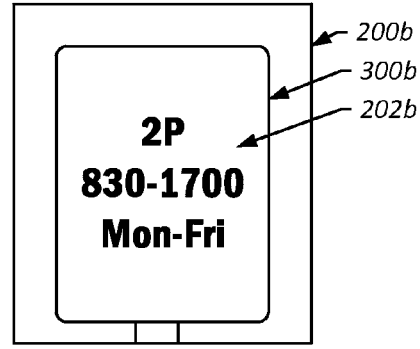

FIG. 3B illustrates an exemplary image 200b of a parking sign 300b including parking information 202b specifying "2P 830-1700 Mon-Fri". "2P 830-1700 Mon-Fri" may be indicative of a two hour parking limit (e.g., "2P") that is enforced 8:30 am through 5:00 pm, Monday through Friday. Accordingly, a vehicle may be authorized to park in a parking space corresponding to parking sign 300b for a maximum duration of two consecutive hours between the times of 8:30 am and 5:00 pm, Monday through Friday. Vehicles may need to be moved from a parking space corresponding to parking sign 300b within two hours of being parked in the space during the listed time periods to avoid a penalty.

Figure 3C:
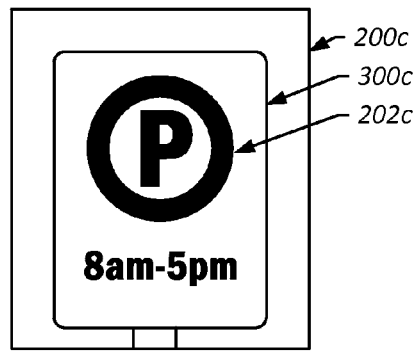

FIG. 3C illustrates an exemplary image 200c of a parking sign 300c including parking information 202c including a symbol of a "P" surrounded by a circle and specifying the times of "8 am-5 pm". Parking information 202c may be indicative of parking being authorized between the hours of 8:00 am and 5:00 pm daily. Accordingly, a vehicle may be authorized to park in a parking space corresponding to parking sign 300c between the hours of 8:00 am and 5:00 pm, every day of the week. Vehicles may need to be moved from a parking space corresponding to parking sign 300b between the hours of 5:00 pm and 8:00 am to avoid a penalty.

Figure 3D:
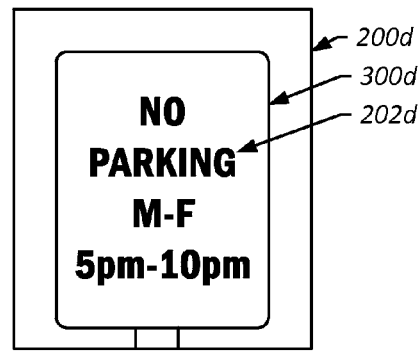

FIG. 3D illustrates an exemplary image 200d of a parking sign 300d including parking information 202d specifying "No Parking M-F 5 pm-10 pm". Parking information 202d may be indicative of parking being unauthorized between the hours of 5:00 pm and 10:00 am, Monday through Friday. Accordingly, a vehicle may be authorized to park in a parking space corresponding to parking sign 300d between 10:00 pm and 5:00 pm every day, and all day Saturday and Sunday. Vehicles may need to be moved from a parking space corresponding to parking sign 300b between the hours of 5:00 pm and 10:00 pm, Monday through Friday, to avoid a penalty.

Figure 4:
FIG. 4 illustrates an exemplary image of a parking receipt including parking information in accordance with one or more embodiments of the present technique.

FIG. 4 illustrates an exemplary image 200e of a parking receipt 400 including parking information 202e in accordance with one or more embodiments of the present technique. Parking receipt 400 may include a receipt that is issued to a user as a proof of payment of a parking fee that authorizes the user to park their vehicle within a given parking location for at least a given period of time. In some embodiments, parking receipt 400 may include a printed-paper receipt issued by an electronic parking meter. For example, upon user 108 parking their vehicle in a metered parking space along "Main Street", user 108 may locate a parking meter at or near the metered parking space, user 108 may submit payment to the parking meter (e.g., via cash, credit card, or other suitable form of payment), and the parking meter may issue parking receipt 400. In some embodiments, user 108 may be required to display parking receipt 400 within the parked vehicle such that a parking attendant may view the parking receipt to determine whether or not the vehicle is authorized to be parked in the parking space currently occupied by the vehicle. For example, user 108 may place parking receipt 400 on a dash of their vehicle and/or adhere parking receipt 400 to an interior of a window of their vehicle such that a parking attendant is able to inspect parking receipt 400 to verify whether or not the vehicle is authorized to park in the space in which it is parked.

In some embodiments, parking information 202e may include an expiration time and/or date (e.g., "5:00 pm Jan. 4, 2011"), a barcode (e.g., a barcode that may be scanned to determine an expiration time and date), and so forth. A vehicle displaying parking receipt 400-including the illustrated parking information 202e may be authorized to park in a corresponding parking space along "Main Street" until 5:00 pm of Tuesday, Jan. 4, 2011.

Figure 5:
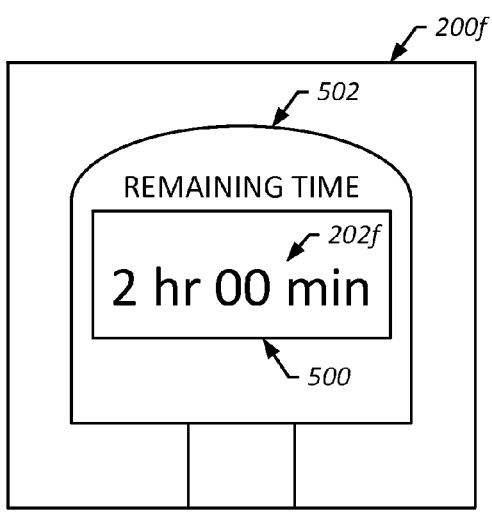
FIG. 5 illustrates an exemplary image of a parking meter display in accordance with one or more embodiments of the present technique.

FIG. 5 illustrates an exemplary image 200f of a display 500 of a parking meter 502 in accordance with one or more embodiments of the present technique. In some embodiments, parking meter display 500 may include parking information 202f indicative of temporal limitations for parking within a parking location corresponding to parking meter 502.

Parking meter 502 may include a device for collecting monetary payment in exchange for the right to park a vehicle in a given parking location for a given amount of time. Parking meter 502 may be provided at or near a parking space or similar parking locations. For example, parking meter 502 may be located adjacent an individual parking space and/or a group of parking spaces of a parking facility. Upon submission of payment to parking meter 502 (e.g., via cash, credit card, or other suitable form of payment), display 500 may provide a visual indication of an expiration time. For example, in the illustrated embodiment, the text of "Remaining Time" in combination with the display 500 specifying "2 hr 00 min" may be indicative of approximately two hours of remaining time for authorized parking in a parking space corresponding to the parking meter. In the illustrated embodiment, display 500 includes a digital display specifying an amount of remaining time. In some embodiments, display 500 may include other forms of display indicative of an amount of time remaining, such as an analog dial indicative of the remaining time.

Referring again to at least FIG. 2, in some embodiments, parking data 204 may be forwarded from access device 104 to parking management server 102. As discussed herein, parking data 204 may be processed to identify a parking expiration time associated with parking location 203. In some embodiments, parking data 204 may include image data 206, location data 208 and/or time data 210. In some embodiments, parking management server 102 may store parking data 204 in datastore 122.

Image data 206 may include data indicative of image 200 and/or other data including a visual representation of parking information 202. For example, where user 108 acquires image 200a of parking sign 300a, image data 206 may include an image file corresponding to image 200a. In some embodiments, image data 206 may include raw image data corresponding to acquired image 200. For example, access device 104 may acquire image 200 and forward corresponding image data 204 with little or no processing. In some embodiments, image data 206 may include processed image data corresponding to acquired image 200. For example, access device 104 may acquire image 200, access device 104 may process image 200 and forward image data 204 corresponding to processed image 200 to parking management server 102. In some embodiments, processing may include compression of image 200, filtering of image 200, various types of image processing (e.g., application OCR, pattern/shape matching, and/or similar image processing techniques) or the like. In some embodiments, processing may include conducting some or all of the processing described herein as occurring at parking management server 102. Such processing at access device 104 (e.g., preliminary processing) may provide for off-loading some or all of the processing tasks from parking management server 102 to access device 104.

Location data 208 may be indicative of parking location 203 in which vehicle 201 is parked. In some embodiments, location data 208 may be indicative of a geographic location of access device 104 at or near the time of acquiring image 200 of parking information 202 corresponding to the parking location. For example, upon user acquiring image 200 via access device 104, access device 104 may determine its geographic location at or near the time of acquiring image 200 and may forward the determined geographic location to parking management server 102 via location data 208. In some embodiments, access device 106 may acquire its location via any suitable positioning technique. For example access device 104 may acquire geographic coordinates corresponding to its location via an integrated via a global positioning system (GPS) device, via assessing its location relative to nearby network access points (e.g., cell phone towers and/or Wi-Fi access points) or the like. In some embodiments, location data 208 may be provided from a source other than access device 104. For example, upon receiving parking data 204, parking management server 102 may query a proxy server of network 106 for location data 208 corresponding to a geographic location of access device 104.

Any location data (such as location data 208) is used in a way that respects user privacy. For example, a user's location may not be obtained or tracked unless the user has provided permission after being informed as to how the user's location data is to be used. Furthermore, location data that is collected can be stored and handled in a way that ensures user privacy.

In some embodiments, location data 208 may be used to determine a geographic location of parking location 203. Where user 108 has parked vehicle 201 in a parking location 203 and acquired an image 200 of a parking sign, parking receipt, parking meter display or the like that includes parking information 202 corresponding to parking location 203, access device 104 may forward, to parking management server 102, parking data 204 that includes location data 208. Parking management server 102 may process location data 208 to identify parking location 203 corresponding thereto. In some embodiments, parking management server 102 may store data corresponding to the determined parking location 203 in datastore 122.

Time data 210 may be indicative of a time of acquisition of image 200. For example, upon acquisition of image 200, access device 104 may record at least an approximate time that image 200 was acquired. Time data 210 may include a time of day (e.g., 15:00 hours) and/or a date (e.g., Jan. 4, 2011). In some embodiments, parking management server 102 may store data corresponding to time data 210 in datastore 122.

In some embodiments, some or all of parking data 204 may be provided by a user. For example, upon parking in a parking location corresponding to parking sign 300a of FIG. 3A, user 108 may manually enter in the string "Two Hour Parking", a current location and/or a current time via access device 106. Such manual entry of data may enable a user to make use of system 100 even when no visible parking information is displayed and/or access device 104 does not have the ability to capture an image.

In some embodiments, parking management server 102 may process parking data 204 to identify temporal parking limitations associated with a corresponding parking location. For example, parking management server 102 may subject image data 206 to various forms of image processing to identify temporal parking limitations 216 associated with parking information 202. Temporal parking limitations 216 for parking location 203 may correspond to parking information 202 provided via parking signs, parking receipts, parking meter displays, or the like corresponding to parking location 203. In some embodiments, parking management server 102 may store data corresponding to the determined temporal parking limitations 216 in datastore 122.

In some embodiments, processing of image data 206 may include normalizing information 202 such that temporal parking limitations 216 include an absolute/normalized measure of the corresponding time periods when a vehicle can be legally parked within a corresponding parking location. In some embodiments, a normalized temporal parking limitation 216 may include a data set indicative of limits on the duration of parking allowed, time periods for allowed parking, and corresponding days. For example, parking information 202a specifying "Two Hour Parking" may be converted into the normalized temporal parking limitation of "2 hour, anytime, daily". Parking information 202b specifying "2P 830-1700 Mon-Fri" may be converted into the normalized temporal parking limitation of "2 hour, 8:30 am to 5:00 pm, Monday to Friday". Parking information 202c including a symbol of a "P" surrounded by a circle and specifying the times of "8 am-5 pm" may be converted into the normalized temporal parking limitation of "any duration, 8:00 am to 5:00 pm, daily". Parking information 202d specifying "No Parking M-F 5 pm-10 pm" may be converted into the normalized temporal parking limitation of "any duration, 10:00 pm to 5:00 pm, Monday to Friday; any duration, anytime, Saturday to Sunday". Parking information 202e specifying "Expires: 500 pm, Jan. 4, 2011" may be converted into the normalized parking limitations of "any duration, until 5:00 pm, Jan. 4, 2011". Parking information 202f specifying "Remaining Time; 2 hr 00 min" associated with time data 210 indicative of the time of 3:00 pm on Tuesday, Jan. 4, 2011, may be converted into the normalized temporal parking limitation of "any duration, until 5:00 pm, Jan. 4, 2011".

In some embodiments, image processing techniques may include optical character recognition (OCR) processing, shape matching processing, pattern matching processing, barcode processing or the like. In some embodiments, OCR processing may be applied image data 206 corresponding to images 200 to identify character strings contained in corresponding parking information 202. For example, OCR processing may be applied to image data 206 corresponding to image 200a of FIG. 3A to identify the string of text "Two Hour Parking". In some embodiments, shape/pattern matching processing may be applied image data 206 corresponding to images 200 to identify symbols contained in parking information 202. For example, shape/pattern matching processing may be applied to image data 206 corresponding to image 200c of FIG. 3C to identify the symbol for allowed parking (e.g., the symbol of a "P" surrounded by a circle). In some embodiments, barcode processing may be applied image data 206 corresponding to images 200a-200f to identify barcodes contained in parking information 202a-202f. For example, barcode processing may be applied to image data 206 corresponding to image 200e of FIG. 4 to identify the barcode provided in parking information 202e and/or a barcode value corresponding thereto.

In some embodiments, image processing may include comparing parking information 202 to a database of text, symbols, shapes, patterns and so forth. In some embodiments, image processing may include comparing parking information to text, symbols, shapes, patterns and so forth that are associated with parking location 203. For example, where image 200 is of a sign adjacent a given parking location 203 in Australia and location data 212 is indicative of image 200 being acquired in Australia, image processing may include comparing parking information 202 to a database of text, symbols, shapes, patterns and so forth that are commonly associated with parking signs, parking receipts, parking meter displays and so forth located in Australia.

In some embodiments, parking management server 102 may determine a parking expiration time 218 based at least in part on temporal parking limitations 216 and/or a corresponding parking data 204. For example, where parking data 204 corresponding to image 200a includes time data 210 indicative of image 200a being acquired at 3:00 pm on Tuesday, Jan. 4, 2011, parking management server 102 may determine a parking expiration time 218 of 5:00 pm Tuesday, Jan. 4, 2011 based at least on the normalized temporal parking limitation of "2 hour, anytime, daily". Where parking data 204 corresponding to image 200b includes time data 210 indicative of image 200a being acquired at 3:00 pm on Tuesday, Jan. 4, 2011, parking management server 102 may determine a parking expiration time 218 of 5:00 pm Tuesday, Jan. 4, 2011 based at least on the normalized temporal parking limitation of "2 hour, 8:30 am to 5:00 pm, Monday to Friday". Where parking data 204 corresponding to image 200c includes time data 210 indicative of image 200c being acquired at 3:00 pm on Tuesday, Jan. 4, 2011, parking management server 102 may determine a parking expiration time 218 of 5:00 pm Tuesday, Jan. 4, 2011 based at least on the normalized temporal parking limitation of "any duration, 8:00 am to 5:00 pm, daily". Where parking data 204 corresponding to image 200d includes time data 210 indicative of image 200d being acquired at 3:00 pm on Tuesday, Jan. 4, 2011, parking management server 102 may determine a parking expiration time 218 of 5:00 pm Tuesday, Jan. 4, 2011 based at least on the normalized temporal parking limitation of "any duration, 10:00 pm to 5:00 pm, Monday to Friday; any duration, anytime, Saturday to Sunday". Where parking data 204 corresponding to image 200e includes time data 210 indicative of image 200e being acquired at 3:00 pm on Tuesday, Jan. 4, 2011, parking management server 102 may determine a parking expiration time of 5:00 pm Tuesday, Jan. 4, 2011 based at least on the normalized temporal parking limitation of "any duration, until 5:00 pm, Jan. 4, 2011". Where parking data 204 corresponding to image 200f includes time data 210 indicative of image 400 being acquired at 3:00 pm on Tuesday, Jan. 4, 2011, parking management server 102 may determine a parking expiration time of 5:00 pm Tuesday, Jan. 4, 2011 based at least on the normalized temporal parking limitation of "any duration, until 5:00 pm, Jan. 4, 2011".

In some embodiments, parking management server 102 may store data corresponding to the determined parking expiration time 218 in datastore 122.

In some embodiments, parking management server 102 may provide an indication of parking expiration time 218 to access device 104. In some embodiments, parking expiration time 218 may be presented to user 108 via access device 104. For example, in response to acquiring/submitting an image 200 of parking information 202 via access device 104, access device 104 may transmit corresponding parking data 204 to parking management server 102 for processing, parking management server 102 may return data 220 indicative of a determined parking expiration time 218 and/or access device 104 may graphically display an indication of expiration time 218 to user 108. Accordingly, in some embodiments, user may be apprised of a parking expiration time by simply submitting a photograph of a parking sign, parking receipt or parking meter display via a mobile communications device.

In some embodiments, parking management system 100 may provide a parking expiration reminder in advance of a parking expiration time, thereby enabling a user to resolve potential issues regarding parking expiration prior to the actual expiration of parking authorization. In some embodiments, parking management system 100 may continuously track the location of a user relative to a location where their vehicle is parked (e.g., parking location 203) and provide a parking expiration reminder far enough in advance of the parking expiration time such that the user is alerted with sufficient time to return to their vehicle prior to the expiration time. As noted above, the location tracking can be subject to user consent, and can, for example, be discarded after it is no longer needed to provide the parking expiration reminder.

In certain embodiments, the time at which a parking expiration reminder is provided may be based on an estimated travel time indicative of the time required for a user to travel to a parking location from their current location (e.g., a current geographic location of access device 104). In certain embodiments, an estimated travel time may include an additional amount of buffer time (e.g., an extra five minutes, 10% of the estimated return time, or the like) to account for potential delays in the user's return to the parking location from their current location. In some embodiments, a parking expiration reminder may be provided when an estimated return time meets or exceeds (e.g., is about equal to or greater than) a determined parking expiration time. Accordingly, a parking expiration reminder may provide a user with enough time to return to their vehicle at the parking location and resolve any parking authorization issues prior to the determined expiration time.

Figure 6:
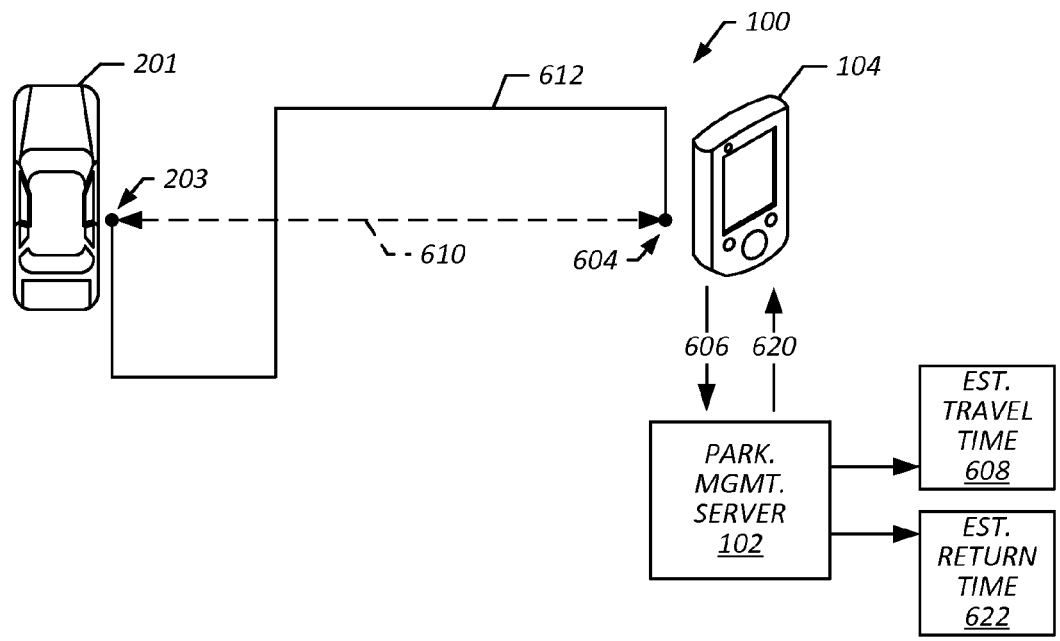
FIG. 6 is a diagram that illustrates reminder operations of an exemplary embodiment of parking management system in accordance with one or more embodiments of the present technique.

FIG. 6 is a diagram that illustrates reminder operations of parking management system 100 in accordance with one or more embodiments of the present technique. In some embodiments, as user 108 travels away from their vehicle 201 parked in parking location 203, parking management server 102 may be apprised of a current geographic location 604 of access device 104 and/or user 108. For example, access device 104 may forward location updates (e.g., geographic coordinates) 606 indicative of its current geographic location 604. Parking management server 102 may determine a current location 604 of user 108 and/or access device 104 based on one or more of the most recently received location updates 606.

Access device 104 may forward location updates 606 on a substantially regular basis, on a periodic basis, or some other basis. For example, access device 104 may forward location updates 606 to parking management server 102 about every one second, five seconds, thirty seconds, one minute, five minutes, ten minutes, or any suitable frequency. In some embodiments, parking management server 102 may be provided location information based on location updates provided to other entities of system 100 by access device 104. For example, access device 104 may provide its location to a network server independent of parking application 110 (e.g., via a location sharing application running on access device 104) and parking management server 102 may obtain corresponding location information (e.g., location updates) for access device 104 from the network server. Such embodiments may help to eliminate redundant transmissions by access device 104 regarding its location, thereby conserving power, reducing processing and/or reducing network transmissions. In some embodiments, access device 104 may forward, to parking management server 102, location updates 606 in response to detecting a change in location that exceeds a given threshold distance. For example, upon detecting that a current location of access device 104 is greater than fifty-meters from a location corresponding to the previously provided location update 606, access device 104 may forward, to parking management server 102, a current location update 606 indicative of the current geographic location 604 of access device 104. In some embodiments, location updates 606 may be transmitted automatically, (e.g., without being requested by parking management server 102). For example, access device 104 may push location updates 606 to parking management server 102. In some embodiments, location updates 606 may be transmitted in response to a request for location information. For example, access device 104 may send location updates 606 to parking management server 102 in response to queries by parking management server 102 for location information.

In some embodiments, parking management server 102 may estimate a time required for user 108 to return to parking location 203 from a current location 604 corresponding to the latest received location update 606. For example, where current location 604 is determined to be about one kilometer from parking location 203, parking management server 102 may determine an estimated travel time 608 indicative of the estimated time required for user 108 to travel the one kilometer to return to parking location 203 from current location 604. Where it is estimated that a user is capable of walking at a rate of about five kilometers per hour (km/h), parking management server 102 may calculate an estimated travel time 608 of approximately twelve minutes. In some embodiments, parking management server 102 may store data corresponding to estimated travel time 608 in datastore 122.

In some embodiments, an estimated travel time 608 may take into account a likely route to be traveled by user 108. For example, although current location 604 may be approximately one-kilometer in straight-line distance 610 from parking location 203, parking management server 102 may identify a route 612 between current location 604 and parking location 203 that is likely to be traversed by user 108. Route 612 may include various changes in path (e.g., turns that follow walking paths, streets and the like) and/or various modes of transportation (e.g., walking, driving, public transportation, or the like) that user 108 may employ to return to parking location 203. Parking management server 102 may calculate estimated travel time 608 based on route 612. For example, parking management server 102 may determine an estimated travel time 608 of approximately fifteen minutes based on user 108 traveling from current location 604 to parking location 203 via route 612. In some embodiments, a mapping service may be employed to provide an estimated travel time 608 and/or route 612. For example, parking management server 102 may query a map server for an estimated travel time 608 and/or route 612 from current location 604 to a parking location 203. Such a technique may off-load or otherwise distribute certain processing requirements between components of system 100.

In some embodiments, estimated travel time 608 may include a factor of safety. For example, estimated travel time 608 may include additional amount of time (e.g., a buffer) to account for potential delays in user's return to a parking location. In some embodiments, additional time is added to an estimate of the amount of time that it should take a user to travel to parking location 203 from current location 604. For example, where a buffer time is five minutes and where it is estimated that it should take user 108 approximately fifteen minutes to travel to parking location 203 from current location 604 via route 612, the estimated travel time may be calculated as twenty-minutes based on the buffer time being added to the estimated amount of time that it should take user 108 to travel to parking location 203 from current location 604.

In some embodiments, a buffer time may include an absolute value. For example, a buffer time may include a value of five minutes or any suitable amount of time. In some embodiments, a buffer time may include a relative value (e.g., a value that varies based an estimate of the amount of time that it should take a user to travel to a parking location from their current location). For example, where a buffer time is specified as 20% of the estimated time that it should take a user to travel to parking location 203 from current location 604 and where it is estimated that it should take user 108 approximately fifteen minutes to travel to parking location 203 from current location 604 via route 612, the buffer time may be approximately three minutes, and the estimated travel time 608 may be about eighteen minutes based on the buffer time being added to the estimated amount of time that it should take user 108 to travel to parking location 203 from current location 604.

In some embodiments, parking management server 102 may provide a parking expiration reminder 620 to a user when is determined that a user may need to begin to travel to parking location 203 from current location 604. For example, an expiration reminder 620 may be provided at a time that enables a user to physically return to the parking location 203 at or near parking expiration time 218. Such a parking expiration reminder 620 may enable a user to resolve issues regarding parking expiration prior to the actual expiration of parking authorization. For example, providing a parking expiration reminder 620 may afford a user an opportunity to pay an additional fee to extend a time period for authorized parking, to physically move the vehicle from the parking location 203, or the like, thereby avoiding associated penalties.

In some embodiments, parking management server 102 may determine whether or not to send a parking expiration reminder based on a comparison of a parking expiration time determined for a parking location and an estimated return time. In some embodiments an estimated return time 622 may include a time at which it is estimated that a user would return to parking location 203 from their current location 604 if they began travelling at or near the current time. For example, a return time may include an estimated travel time 608 from a user's current location 604 to parking location 203 added to the current time. Where a current time is approximately 4:40 pm and the estimated travel time is approximately eighteen minutes, a corresponding estimated return time 622 may be about 4:58 pm. In some embodiments, parking management server 102 may store data corresponding to estimated return time 622 in datastore 122.

In some embodiments, a parking expiration reminder may be provided when an estimated return time is approximately equal to or greater than a corresponding parking expiration time. For example, parking management server 102 may provide a parking expiration reminder 620 to access device 104 upon determining that a corresponding estimated return time 622 is equal to or greater than parking expiration time 218. In an exemplary embodiment, where an expiration time 218 for vehicle 201 parked in parking location 203 is determined to be 5:00 pm, the current time is determined to be 4:40 pm, an estimated travel time 608 from current location 604 to parking location 203 is determined to be eighteen minutes and, thus, an estimated return time 622 is determined to be about 4:58 pm based on the current time of 4:40 pm and the estimated travel time 608 of about eighteen minutes, a parking expiration reminder may not be transmitted from parking management server 102 to user access device 104 based at least upon the estimated return time 622 not being equal to or greater than parking expiration time 218. In an exemplary embodiment, where an expiration time 218 for vehicle 201 parked in parking location 203 is determined to be 5:00 pm, the current time is determined to be 4:42 pm (or later), an estimated travel time 608 from current location 604 to parking location 203 is determined to be eighteen minutes and, thus, an estimated return time 622 is determined to be about 5:00 pm (or later) based on the current time of 4:42 pm (or later) and the estimated travel time 608 of about eighteen minutes, a parking expiration reminder 620 may be transmitted from parking management server 102 to user access device 104 based at least upon the estimated return time 622 being equal to (or greater than) parking expiration time 218.

In some embodiments, a parking expiration reminder 620 may be provided when an estimated return time is about equal to or greater than a corresponding offset parking expiration time. For example, parking management server 102 may provide a parking expiration reminder 620 to access device 104 upon determining that an estimated return time 622 is within an offset parking expiration time 218. An offset parking expiration time 218 may include a parking expiration time that is shifted relative to a raw parking expiration time determined based on parking information. For example, where the raw parking expiration time is 5:00 pm, an offset parking expiration time 218 may be determined to be about 4:55 pm. In an exemplary embodiment, where an offset expiration time 218 for vehicle 201 parked in parking location 203 is determined to be 4:55, the current time is determined to be 4:37 pm, an estimated travel time 608 from current location 604 to parking location 203 is determined to be eighteen minutes and an estimated return time 622 is determined to be about 4:55 pm based on the current time of 4:37 pm and the estimated travel time 608 of about eighteen minutes, a parking expiration reminder 620 may be transmitted from parking management server 102 to access device 104 based at least upon the estimated return time 622 being equal to or greater than the determined offset parking expiration time 218. In some embodiments, providing alerts based on an offset parking expiration time may provide a margin a safety that provides additional time for a user to receive the parking expiration reminder and/or make arrangements to return to their vehicle. In some embodiments, the offset technique may be employed in-place of or in combination with the buffer time techniques described herein.

In some embodiments, a parking expiration reminder may be employed to alert a user to the potential expiration and/or the expiration of authorization for their vehicle to remain parked in a given parking location. For example, parking expiration reminder 620 may include content that informs user 108 of a current time, parking expiration time 218, estimated travel time 608, and/or route 612. In some embodiments, reminder 620 may include content that is presented to user 104 via a user interface of access device 104. For example, reminder 620 may include content that is to be presented via an audible alert (e.g., a beep), an audible announcement (e.g., a voice) and/or visibly displayed to user 108 via a graphical user interface of access device 104.

Figure 7:
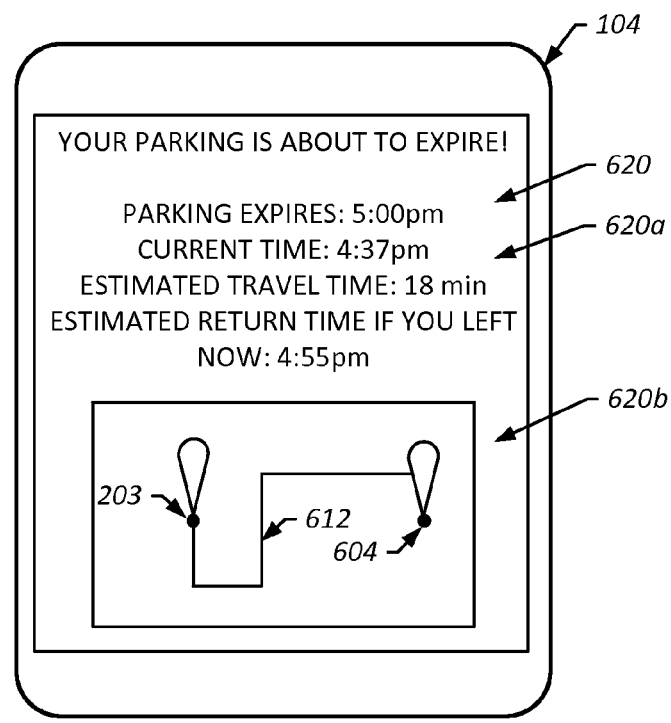
FIG. 7 is a diagram that illustrates an exemplary display of a parking expiration reminder in accordance with one or more embodiments of the present technique.

FIG. 7 is a diagram that illustrates an exemplary display of a parking expiration reminder 620 in accordance with one or more embodiments of the present technique. Parking expiration reminder 620 may be rendered for display via a graphical user interface of access device 104. In some embodiments, parking expiration reminder 620 may include a first display portion 620a providing a warning regarding parking expiration, a parking expiration time, a current time, an estimated travel time and/or an estimated return time. In some embodiments, parking expiration reminder 620 may include a second display portion 620b illustrating route 612 from current location 604 to parking location 203.

In some embodiments, reminders 620 may be provided until it is determined that a user has returned to their vehicle, an estimated return time does not meet and/or exceed a corresponding expiration time and/or offset expiration time, and/or a user has requested to cancel the parking expiration reminder.

Figure 8:
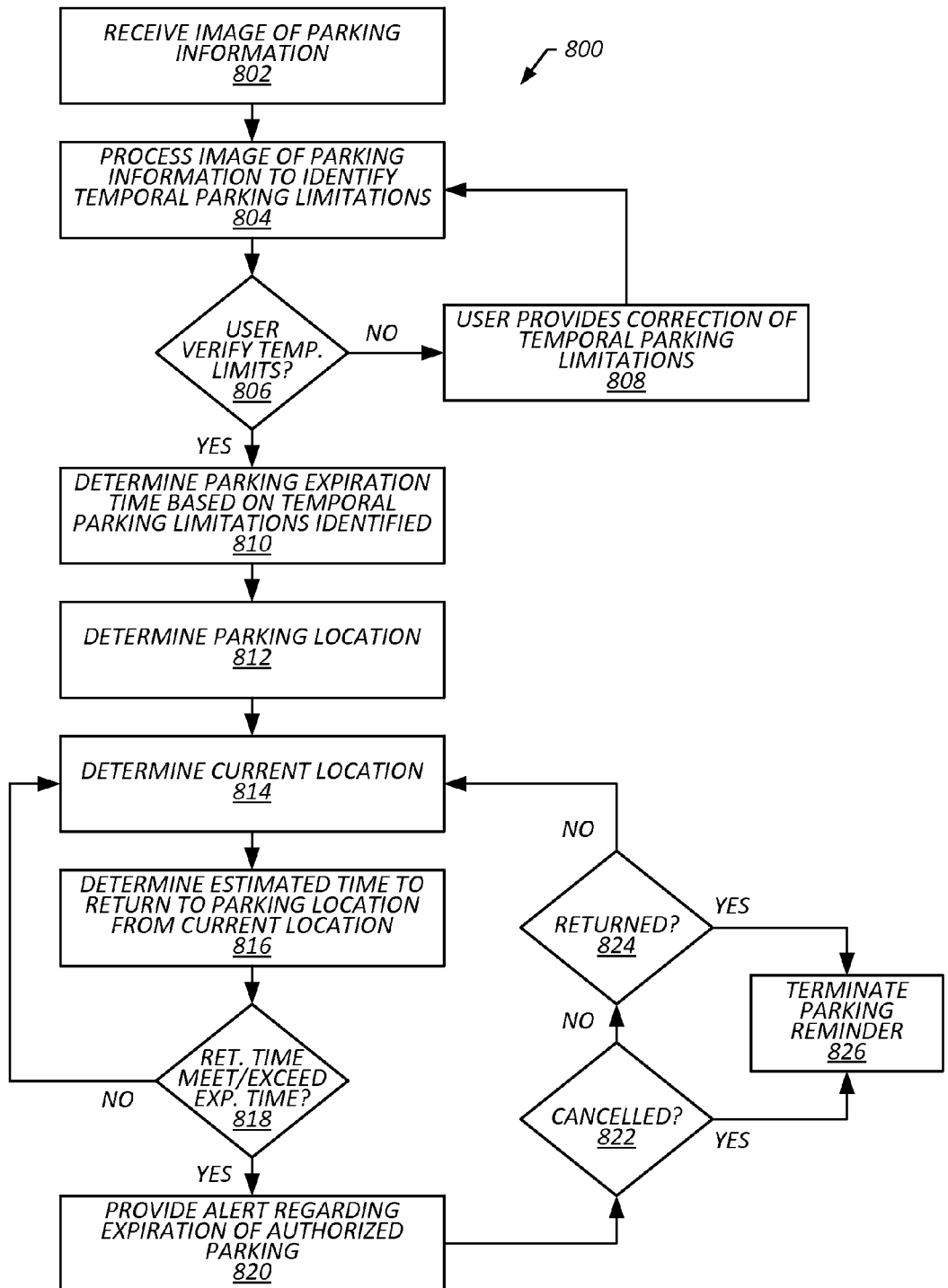
FIG. 8 is a flowchart that illustrates a method of providing parking expiration reminders in accordance with one or more embodiments of the present technique.

FIG. 8 is a flowchart that illustrates a method 800 of providing parking expiration reminders in accordance with one or more embodiments of the present technique. In some embodiments, method 800 may include receiving an image of parking information, as depicted at block 802. For example, receiving an image of parking information may include receiving an image 200 of parking information 202 visibly displayed via a parking sign, a parking receipt, a parking meter display or the like associated with a given parking location 203 (e.g., a parking space) and acquired via access device 104.

In some embodiments, method 800 may include processing an image of parking information to identify temporal parking limitations, as depicted at block 804. For example, processing an image of parking information to identify temporal parking limitations may include access device 104 and/or parking management server 102 processing image 200 and/or image data 206 to identify temporal parking limitations 216 indicative of a time for authorized and/or unauthorized parking in parking location 203.

In some embodiments, a user may be afforded an opportunity to approve or otherwise verify the temporal parking limitations identified, as depicted at block 806. For example, user 108 may be presented, via access device 104, with a display of the temporal parking limitations identified (e.g., "2 hour, anytime, daily"), and may select to approve/verify or disapprove the parking limitations as identified. For example, where the temporal parking limitations identified are indicated as "2 hour, anytime, daily" and the image is of parking sign 300a, user 108 may approve/verify the parking limitations as identified. In some embodiments, upon approval/verification of the parking limitations, method 800 may proceed to determining a parking expiration time based on the approved/verified temporal parking limitations identified, as discussed below with regard to block 810. As a further example, where the image is of parking sign 300a, and the incorrect parking limitations of "7 hour, anytime, daily" are identified user 108 may not approve/verify the parking limitations as depicted. In some embodiments, the user may be provided with the opportunity to edit/correct the parking limitations identified, as depicted at block 808. For example, user 108 may be presented, via access device 104, with a display of the temporal parking limitations identified of "7 hour, anytime, daily" and may edit the "7" to a "2" using a text editor. In some embodiments, the user may be provided with a mapping of the temporal parking limitations identified to the parking information contained in the image. Such a mapping may enable the user to gather a better understanding of how the identified temporal limitations were derived. For example, user 108 may be presented with an image similar to that of image 200a that includes an overlay annotating how and/or from where in the image the values of "7 hour, anytime, daily" were derived. In some embodiments, the correction process may occur iteratively until the user approves/verifies the temporal parking limitations. Accordingly, a user may be provided with an opportunity to view and/or augment the identified parking limitations prior to the parking limitations being relied on in subsequent processing.

In some embodiments, method 800 may include determining a parking expiration time based on temporal parking limitations identified, as depicted at block 810. For example, determining a parking expiration time based on temporal parking limitations identified may include access device 104 and/or parking management server 102 determining a parking expiration time 218 based at least in part on the identified temporal parking limitations 216. In some embodiments, the parking expiration time may be displayed to the user. For example, user 108 may be presented, via access device 104, with a display that states "Parking Expires at 5 pm (in 120 minutes)". In some embodiments the parking expiration time may be accompanied by a statement of corresponding temporal parking limitations. For example, user 108 may be presented, via access device 104, with a display that states "Your parking expires at 5 pm (in 120 minutes)" and "Restrictions on your parking space: 2 hour parking limit, anytime, daily".

In some embodiments, method 800 may include determining a parking location, as depicted at block 812. For example, determining a parking location may include determining a geographic location of parking location 203.

In some embodiments, method 800 may include determining a current location, as depicted at block 814. For example, determining a current location may include determining a current geographic location 604 of access device 104 and/or user 108.

In some embodiments, method 800 may include determining an estimated time to return to a parking location from a current location, as depicted at block 816. For example, determining an estimated time to return to a parking location from a current location may include determining an estimated return time 622 indicative of a time at which it is estimated that user 108 would return to parking location 203 from their current location 604 if they began travelling at or near the current time.

In some embodiments, method 800 may include determining whether or not a return time meets and/or exceeds an expiration time, as depicted at block 818. For example, determining whether or not a return time exceeds an expiration time may include determining whether or not return time 622 is equal to, to approximately equal to or greater than a parking expiration time 218 (e.g., a raw expiration time and/or an offset expiration time).

In some embodiments, where it is determined that a return time does not meet and/or exceed an expiration time, method 800 may include continuing to monitor current location (e.g., current location 604) relative to the parking location (e.g., parking location 203) to determine whether or not a return time (e.g., return time 608) exceeds the expiration time (e.g., expiration time 218).

In some embodiments, where it is determined that a return time does meet and/or exceed an expiration time, method 800 may include providing an alert regarding expiration of authorized parking, as depicted at block 820. For example, providing an alert regarding expiration of authorized parking may include providing parking expiration reminder 620 for presentation to user 108 via access device 104. For example, parking management server 102 may transmit, to access device 104, content including parking expiration reminder 620. Parking expiration reminder 620 may be rendered for display as depicted and discussed with regard to at least FIG. 7.

In some embodiments, upon providing an alert regarding expiration of authorized parking, method 800 may include determining whether or not a user has cancelled a request for the parking expiration reminder, as depicted at block 822, and/or whether or not the user has returned to the parking location, as depicted at block 824. Where it is determined that a user has not cancelled the request for the parking expiration reminder and has not yet returned to the parking location, method 800 may include continuing to monitor a current location (e.g., current location 604) relative to a parking location (e.g., parking location 203) to determine whether or not a return time (e.g., return time 622) exceeds an expiration time (e.g., expiration time 218) and/or issuing additional parking expiration reminders (e.g., parking expiration reminder 620). Where it is determined that a user has cancelled the request for parking expiration reminders and/or has returned to the parking location, method 800 may include cancelling or otherwise terminating the parking expiration reminder, as depicted at block 826.

Method 800 is an exemplary embodiment of a method employed in accordance with techniques described herein. Method 800 may be may be modified to facilitate variations of its implementations and uses. Method 800 may be implemented in software, hardware, or a combination thereof. Some or all of method 800 may be implemented by parking management module 120 and/or parking application 110. The order of various steps of method 800 may be changed, and various elements may be added, reordered, combined, omitted, modified, etc.

Although certain exemplary embodiments described herein refer to certain processes being performed by a given device/entity (e.g., access device 104 and/or parking management server 102), embodiments may include the described techniques being performed by any suitable device/entity. In some embodiments, access device 104 may include local capabilities that provide for access device 104 performing some or all of the functionality described herein with regard to access device 104 and/or parking management server 102. For example, access device 104 may be capable of performing image processing to identify temporal parking limitations, calculate a travel time, a return time, issue parking expiration reminders and so forth.

Exemplary Computer System

Figure 9:
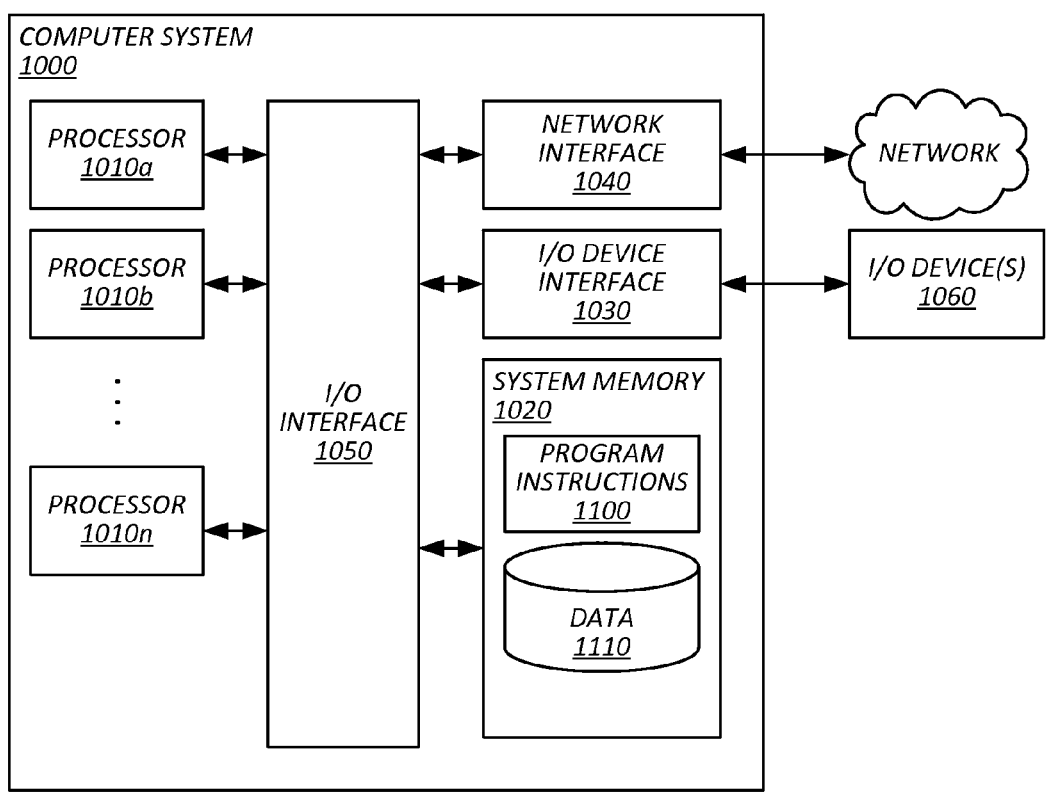
FIG. 9 is a diagram that illustrates an exemplary computer system in accordance with one or more embodiments of the present technique.

FIG. 9 is a diagram that illustrates an exemplary computer system 1000 in accordance with one or more embodiments of the present technique. Various portions of systems and methods described herein, may include or be executed on one or more computer systems similar to system 1000. For example, one or more entities of system 100 (e.g., parking management server 102 and/or access device 104) may include a configuration similar to at least a portion of computer system 1000. Methods/processes/modules described herein may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and/or data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry (e.g., an FPGA (field programmable gate array) or an ASIC (application specific integrated circuit)). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Any headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method of providing a parking expiration alert, the method comprising:
   receiving image data corresponding to a photograph of a display of parking information comprising temporal restrictions for authorized parking in a parking location, the photograph captured via a mobile communications device;
   processing the image data to determine an estimated parking expiration time corresponding to a time when authorization for parking within the parking location will expire;
   substantially continuously tracking a current location of the mobile communications device and determining an estimated return time corresponding to an estimated time required to travel to the given parking location from the current location of the mobile communications device; and
   in response to determining that the estimated return time is about equal to or greater than the estimated parking expiration time, providing a parking expiration alert indicative of the estimated return time being determined to be about equal to or greater than the estimated parking expiration time, the parking expiration alert configured to be presented via the user interface of the mobile communications device.

2. A computer-implemented method, comprising:
   receiving image data corresponding to a photographic image acquired via a mobile communications device, the photographic image comprising an image of physically displayed parking information associated with a parking location, the parking information indicative of temporal limitations for parking within the parking location;
   determining a parking expiration time based on the image data, the parking expiration time being indicative of a time when authorization for parking within the parking location will expire; and
   providing, to the mobile communications device, expiration data indicative of the parking expiration time, an indication of the parking expiration time configured to be presented to a user via a user interface of the mobile communications device.

3. The method of claim 2, wherein the photographic image comprises an image acquired via an image capture device of the mobile communications device.

4. The method of claim 2, wherein determining a parking expiration time based on the image data comprises:
   identifying temporal limitations for authorized parking within the associated parking location via application of image processing to at least a portion of the image data corresponding to the photographic image; and
   determining the parking expiration time based at least in part on the temporal limitations identified.

5. The method of claim 4, wherein identifying temporal limitations for authorized parking within the associated parking location via image processing of the image data corresponding to the photographic image comprises identifying temporal limitations for parking within the associated parking location via application of at least one of optical character recognition image processing and pattern/shape matching image processing to at least a portion of the image data corresponding to the photographic image.

6. The method of claim 4, wherein the temporal limitations for authorized parking within the associated parking location comprises an absolute end time, and wherein the expiration time is approximately equal to the absolute end time.

7. The method of claim 6, wherein the absolute end time corresponds to an absolute end time indicated in content of the displayed parking information.

8. The method of claim 4, wherein the temporal limitations for authorized parking within the associated parking location comprises a duration of time corresponding to a time when authorization for a vehicle currently parked in the parking location will expire and wherein the parking expiration time is determined based on a sum of a start time and the duration of time.

9. The method of claim 8, wherein the start time corresponds to a time at which the photographic image is acquired.

10. The method of claim 8, wherein the start time corresponds to a start time indicated in content of the displayed parking information.

11. The method of claim 2, wherein the photographic image comprises an image of a parking sign displayed in association with the parking location, the parking sign comprising the parking information indicative of temporal limitations for parking within the parking location.

12. The method of claim 2, wherein the photographic image comprises an image of a printed parking receipt comprising the parking information indicative of temporal limitations for parking within the parking location.

13. The method of claim 2, wherein the photographic image comprises an image of a parking meter comprising the parking information indicative of temporal limitations for parking within the parking location.

14. The method of claim 2, further comprising:
   determining that a current time corresponds to the parking expiration time; and
   in response to determining that a current time corresponds to the parking expiration time, providing, to the mobile communications device, a reminder indicative of the current time corresponding to the parking expiration time, the reminder configured to be presented via the user interface of the mobile communications device.

15. The method of claim 2, further comprising:
   determining a geographic location of the parking location;
   determining a current geographic location of the mobile communications device;
   determining an estimated time of return to the geographic location of the parking location from the current geographic location of the mobile communications device;
   determining that the estimated time of return to the geographic location of the parking location from the current geographic location of the mobile communications device is about equal to or greater than the parking expiration time; and
   in response to at least determining that the estimated time of return to the geographic location of the parking location from the current geographic location of the mobile communications device is about equal to or greater than the parking expiration time, providing, to the mobile communications device, the expiration data comprising a reminder indicative of the estimated time of return to the geographic location of the parking location from the current geographic location of the mobile communications device is about equal to or greater than the parking expiration time, the reminder configured to be presented to the user via the user interface of the mobile communications device.

16. The method of claim 15, wherein the estimated time of return to the geographic location of the parking location from the current geographic location of the mobile communications device comprises an estimated time at which a user is estimated to physically return to the geographic location of the parking location from the current geographic location of the mobile communications device.

17. The method of claim 15, wherein the estimated time of return to the geographic location of the parking location from the current geographic location of the mobile communications device comprises a total of the following:
   an estimated travel time corresponding to an estimated amount of time required for the user to return to the geographic location of the parking location from the current geographic location of the mobile communications device; and
   a buffer amount of time configured to account for potential delays in the user returning to the parking location from the current geographic location of the mobile communications device.

18. The method of claim 2, wherein the mobile communications device comprises at least one or more of a cellular phone, a navigation device, or a portable computer device.

19. A non-transitory computer readable storage medium having computer-executable program instructions stored thereon, the program instructions executable by a computer to cause steps comprising:
   receiving image data corresponding to a photographic image acquired via a mobile communications device, the photographic image comprising an image of physically displayed parking information associated with a parking location, the parking information indicative of temporal limitations for parking within the parking location;
   determining a parking expiration time based on the image data, the parking expiration time being indicative of a time when authorization for parking within the parking location will expire; and
   providing, to the mobile communications device, expiration data indicative of the parking expiration time, an indication of the parking expiration time configured to be presented via a user interface of the mobile communications device.

20. A system, comprising:
   a processor;
   a memory; and
   a parking management module stored on the memory, the parking management module configured to be executed by the processor to cause:
      receiving image data corresponding to a photographic image acquired via a mobile communications device, the photographic image comprising an image of physically displayed parking information associated with a parking location, the parking information indicative of temporal limitations for parking within the parking location;
      determining a parking expiration time based on the image data, the parking expiration time being indicative of a time when authorization for parking within the parking location will expire; and
      providing, to the mobile communications device, expiration data indicative of the parking expiration time, an indication of the parking expiration time configured to be presented via a user interface of the mobile communications device.

* * * * *